April 17, 1934.    P. C. TEMPLE    1,955,154
VALVE MECHANISM
Filed Nov. 8, 1932
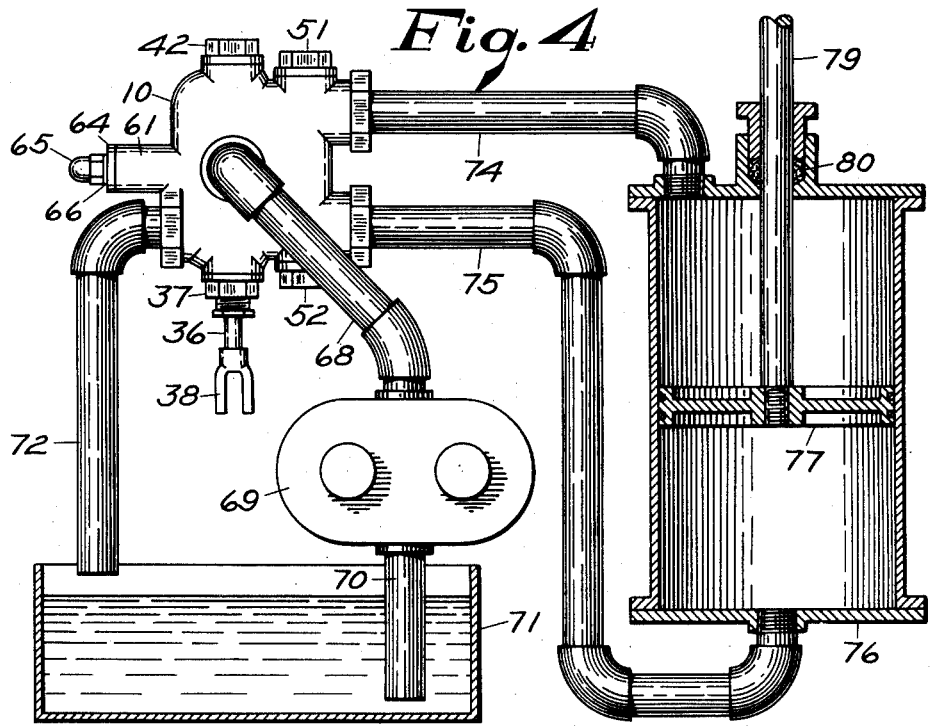
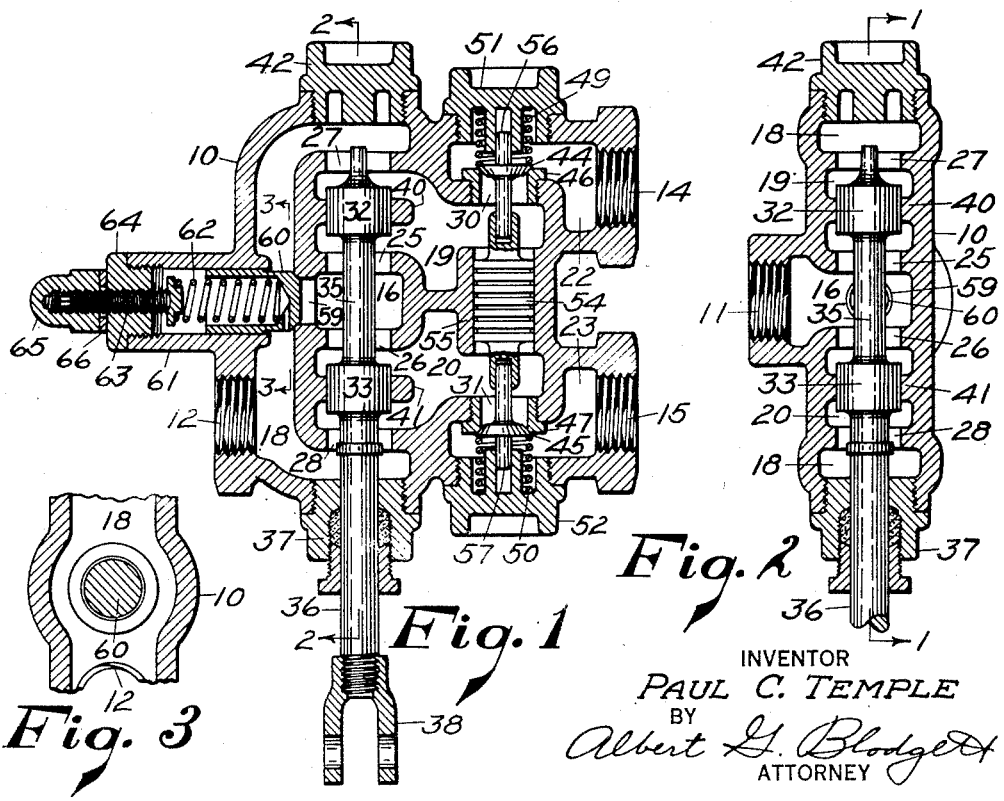
INVENTOR
PAUL C. TEMPLE
BY
Albert G. Blodgett
ATTORNEY Patented Apr. 17, 1934

1,955,154

UNITED STATES PATENT OFFICE 1,955,154

VALVE MECHANISM

Paul C. Temple, Decatur, Ill., assignor to A. W. Cash Company, Decatur, Ill., a corporation of Delaware Application November 8, 1932, Serial No. 641,771

8 Claims. (Cl. 121—38)

This invention relates to valve mechanisms, and more particularly to a construction of this type which is adapted to control the movements of a hydraulic piston.

Tractors are frequently provided with graders, bulldozers, or snow plows which are operated by hydraulic motors supplied with fluid under pressure from a suitable pump, which is usually of the positive displacement type. In the past it has been customary to control the fluid flow by means of a ground key cock, with a separate relief valve in the high pressure pipe line. These key cocks have been found unsatisfactory in actual service, since they stick and soon become scored. This causes leakage and makes it impossible to hold the hydraulic piston at rest in a desired position. Moreover, the prior constructions require complicated and expensive pipe connections at installation. A further disadvantage of such an arrangement resides in the fact that the pump is operated under load at all times, whether the piston is at rest or moving. This results in a waste of power and causes needless wear on the pump.

It is accordingly one object of the present invention to provide a simple and inexpensive valve mechanism which is particularly adapted for controlling the movements of a hydraulic piston.

It is a further object of the invention to provide a valve mechanism which will operate easily at all times, which will be free from leakage, and which will serve to hold the controlled piston positively locked in any desired position.

It is a further object of the invention to provide a valve mechanism which will prevent overloading of the pump in case the controlled piston reaches the limit of its travel, and which will remove substantially all load from the pump when the piston has been brought to rest in a desired position.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a section through a valve mechanism, the section being taken on the line 1—1 of Fig. 2;

Fig. 2 is a section on the line 2—2 of Fig. 1;

Fig. 3 is a section on the line 3—3 of Fig. 1; and

Fig. 4 is a somewhat diagrammatic view, partly in section, showing the valve mechanism connected to other apparatus.

In the drawing I have illustrated a valve mechanism of the four-way type comprising a hollow valve body or casing 10 provided with an inlet opening 11, an outlet or exhaust opening 12, and two openings 14 and 15 which I will call, for lack of a better term, cylinder openings. These various openings are all shown provided with screw-threads, for convenience in connecting pipes thereto. The interior of the casing 10 is divided by suitable partitions into an inlet chamber 16, an exhaust chamber 18, two intermediate chambers 19 and 20, and two operating chambers 22 and 23. The intermediate chambers are located on opposite sides of the inlet chamber, and the exhaust chamber is U-shaped and arranged with its end portions adjacent to the intermediate chambers. The inlet opening 11 leads directly into the inlet chamber 16, and the exhaust opening 12 leads directly from the exhaust chamber 18. The cylinder openings 14 and 15 communicate directly with the operating chambers 22 and 23 respectively. Inlet passages 25 and 26 connect the inlet chamber 16 with the intermediate chambers 19 and 20 respectively, and exhaust passages 27 and 28 connect the exhaust chamber 18 with the intermediate chambers 19 and 20 respectively. Passages 30 and 31 connect the intermediate chambers 19 and 20 with the operating chambers 22 and 23 respectively.

The four passages 25, 26, 27 and 28, which are preferably circular in cross-section and all of the same diameter, are shown arranged in direct axial alignment. The flow through these passages is controlled by a manually operable pilot valve which is so constructed and arranged that all four of the passages may be open simultaneously or passages 26 and 27 may be closed while passages 25 and 28 are open, and vice versa. In this way either of the intermediate chambers 19 and 20 may be connected with the inlet 11 while the other is connected with the exhaust 12. The particular pilot valve illustrated is of the axially slidable type, and comprises two cylindrical portions 32 and 33, equal in diameter to the four aligned flow passages, and connected by a reduced central portion 35. A stem 36 extends downwardly from the cylindrical portion 33 and through a stuffing box 37 mounted on the casing wall. This stem 36 is provided at its lower end with a yoke 38 for convenience in connecting to a suitable operating handle or lever (not shown). The valve portion 32 is slidably supported in a guide 40 located between the passages 25 and 27, and the valve portion 33 is slidably supported in a guide 41 located between the passages 26 and 28. Other means for supporting the pilot valve may be employed in place of the construction illustrated.

The valve portions 32 and 33 are considerably smaller in the axial direction than the distance between the adjacent passages, so that when the pilot valve is in the central or neutral position all of the passages will be open. A plug 42 is shown screw-threaded to the casing 10 in direct line with the pilot valve to facilitate the manufacture of the mechanism.

The flow through the passages 30 and 31 is controlled by valves 44 and 45 respectively, and these valves are preferably of an unbalanced type and arranged to open in the direction of flow out of the intermediate chambers 19 and 20. In the illustrated embodiment the valves 44 and 45 are of the poppet type and associated with annular valve seats 46 and 47. The valves are urged toward closed position by means of coiled compression springs 49 and 50 which are supported in caps 51 and 52 screw-threaded to the casing 10 in direct alignment with the valves.

The valves 44 and 45 are arranged to be actuated automatically in accordance with the relative fluid pressures in the intermediate chambers 19 and 20, which in turn are controlled by the pilot valve. If the pressure in one of the intermediate chambers increases sufficiently, it will open the corresponding valve against the force of its spring and thus allow fluid to pass outwardly through the corresponding cylinder opening. In order that fluid may at the same time flow inwardly through the other cylinder opening, as is necessary in operating a double-acting piston for example, the other valve must also be opened. This result is obtained by utilizing a suitable fluid pressure responsive device, such as a slidable cylindrical piston 54, which is subjected on opposite sides to the pressures in the chambers 19 and 20. This piston 54 is preferably supported in a guideway or cylinder 55 between and in direct alignment with the valves 44 and 45, and a slight lost motion is allowed between the piston and the valves so that when the piston is in its central or neutral position both the valves may close tightly against their respective seats. The guideway 55 is shown integral with the casing 10. In the embodiment illustrated the valves 44 and 45 are provided with valve stems 56 and 57 respectively extending in both directions from the valves, and these valve stems are slidably supported in openings in the ends of the piston 54 and in the caps 51 and 52. This ensures proper guiding and accurate seating of the valves. The piston 54 is somewhat larger in diameter than the valves 44 and 45, and thus has a greater effective area than the valves. Hence the piston is able to provide sufficient force to open either of the valves in spite of the pressure which may be present in the corresponding operating chamber.

When a valve mechanism of this type is used to control a fluid actuated piston, it frequently happens that the piston is allowed to reach the limit of its stroke before the pilot valve is returned to neutral position. In order to prevent damage to the valve mechanism or associated apparatus under these conditions, I preferably provide a suitable device for relieving any excess fluid pressure which may occur. In the embodiment illustrated, a passage 59 is provided to afford communication between the inlet chamber 16 and the exhaust chamber 18, and this passage is normally closed by a relief valve 60 which is slidably supported in a guideway 61 integral with the casing 10. The relief valve is recessed to receive a coiled compression spring 62, and the outer end of the spring is supported on an adjustable screw 63 which is threaded through a cap 64. This cap is screw-threaded to the outer end of the guideway 61. A small cap 65 is threaded to the outer end of the screw 63, and serves to clamp an annular gasket 66 against the cap 64, thus preventing external leakage of fluid. The relief valve 60 is subjected to the pressure in the chamber 16, and whenever this pressure becomes sufficient to compress the spring 62 the valve will open and allow fluid to flow through the passage 59.

Referring now to Fig. 4, I have there shown my improved valve mechanism connected to other apparatus. The inlet opening 11 is connected by a pipe 68 with the discharge port of a pump 69, which may be of the rotary positive displacement type. The suction port of the pump is connected by a pipe 70 with a reservoir 71 containing a suitable liquid, such as oil. A pipe 72 leads from the exhaust opening 12 to the reservoir 71. The cylinder openings 14 and 15 are connected by pipes 74 and 75 respectively to the upper and lower ends of a cylinder 76, in which is mounted a slidable double acting piston 77. A piston rod 79 extends upwardly from the piston 77 and through a stuffing box 80. The entire construction may if desired, be mounted upon a tractor (not shown) and the piston rod 79 may be connected to any device which is to be actuated.

The operation of the invention will now be apparent from the above disclosure. The pump 69 is driven by a suitable source of power, and draws oil through the pipe 70 from the reservoir 71 and delivers the oil through the pipe 68 to the inlet chamber 16. So long as the pilot valve is in the neutral position illustrated, the oil will flow from the chamber 16 through the passages 25 and 26 to the chambers 19 and 20 respectively, and thence through the passages 27 and 28 to the exhaust chamber 18. From the exhaust chamber the oil returns to the reservoir 71 through the pipe 72. The pressures in the intermediate chambers 19 and 20 will be substantially equalized, piston 54 will remain in neutral position, and valves 44 and 45 will be tightly closed, holding the piston 77 stationary in the cylinder 76. If now the pilot valve is moved upwardly so that the cylindrical valve portions 32 and 33 close the passages 27 and 26 respectively, the oil discharged by the pump will all flow through the passage 25 and increase the pressure in the chamber 19, thus forcing open the valve 44 against the spring 49, and entering the upper end of the cylinder 76 through the pipe 74. At the same time the pressure in chamber 19 will force the valve controlling piston 54 downwardly, opening valve 45, and allowing the oil in the lower end of the cylinder 76 to escape through the pipe 75, chamber 23, passage 31, chamber 20, passage 28, exhaust chamber 18, and pipe 72. This will cause the piston 77 to move downwardly. Similarly, if the pilot valve is moved downwardly so that the cylindrical portions 32 and 33 close the passages 25 and 28 respectively, oil will be delivered to the lower end of the cylinder 76 and exhausted from the upper end, thus causing the piston 77 to move upwardly.

The piston 77 can be stopped in any desired position simply by returning the pilot valve to its neutral position. This immediately equalizes the pressures in the intermediate chambers 19 and 20, and valves 44 and 45 will close. Under these conditions the pump 69 will merely circulate the oil under practically no pressure, and a minimum of power is required. The speed of movement of the piston 77 can be varied as desired by means of the pilot valve, the maximum speed being obtained when the pilot valve is moved to either extreme position so that passage 25 or passage 26 is completely closed. If the piston 77 reaches either end of the cylinder 76 before the pilot valve is returned to neutral position, the pressure in the inlet chamber 16 will increase, forcing open the relief valve 60 against its spring 62 and thus allowing the oil to flow to the exhaust chamber 18 through the passage 59. The spring 62 should be adjusted for a relief pressure slightly higher than the pressure required to actuate the piston 77 under normal load conditions.

The entire valve mechanism is self-contained, and requires a minimum of pipe connections, thus simplifying the installation and reducing the space occupied. No load is applied to the pump except when the piston 77 is actually performing work. The piston is positively locked in any position by the seating of the valves 44 and 45. The pilot valve will operate freely at all times without sticking, since it is entirely immersed in oil and can be made a reasonably loose fit without affecting the operation. There is but one stuffing box, and this is subjected only to the exhaust pressure of the oil.

Having thus described my invention, what I claim as new and desire to secure by Letters Patent is:

1. A valve mechanism comprising a hollow casing, partitions dividing the interior of the casing into an inlet chamber, an exhaust chamber and two intermediate chambers, a passage communicating with each intermediate chamber, an unbalanced valve in each passage and arranged to open in the direction of flow out of the chamber, a device responsive to the relative fluid pressures in the two intermediate chambers and arranged to open the valve associated with the chamber having the lower fluid pressure whenever the pressures in the two chambers are materially unequal, inlet passages connecting the inlet chamber with the intermediate chambers, exhaust passages connecting the exhaust chamber with the intermediate chambers, and a movable pilot valve to control the flow through the inlet and exhaust passages.

2. A valve mechanism comprising a hollow casing, partitions dividing the interior of the casing into an inlet chamber, an exhaust chamber and two intermediate chambers, a passage communicating with each intermediate chamber, an unbalanced valve in each passage and arranged to open in the direction of flow out of the chamber, a device responsive to the relative fluid pressures in the two intermediate chambers and arranged to open the valve associated with the chamber having the lower fluid pressure whenever the pressures in the two chambers are materially unequal, inlet passages connecting the inlet chamber with the intermediate chambers, exhaust passages connecting the exhaust chamber with the intermediate chambers, and a movable pilot valve so arranged that one inlet passage and one exhaust passage may be closed while the other inlet and the other exhaust passage are open, or vice versa.

3. A valve mechanism comprising a hollow casing, partitions dividing the interior of the casing into an inlet chamber, an exhaust chamber and two intermediate chambers, a passage communicating with each intermediate chamber, an unbalanced valve in each passage and arranged to open in the direction of flow out of the chamber, a device responsive to the relative fluid pressures in the two intermediate chambers and arranged to open the valve associated with the chamber having the lower fluid pressure whenever the pressures in the two chambers are materially unequal, inlet passages connecting the inlet chamber with the intermediate chambers, exhaust passages connecting the exhaust chamber with the intermediate chambers, and a movable pilot valve having a neutral position in which both inlet and both exhaust passages are open and two other positions in each of which one inlet and one exhaust passage are closed and the other inlet and the other exhaust passage are open.

4. A valve mechanism comprising a hollow casing, partitions dividing the interior of the casing into an inlet chamber, an exhaust chamber and two intermediate chambers, a passage communicating with each intermediate chamber, an unbalanced valve in each passage and arranged to open in the direction of flow out of the chamber, a device responsive to the relative fluid pressures in the two intermediate chambers and arranged to open the valve associated with the chamber having the lower fluid pressure whenever the pressures in the two chambers are materially unequal, inlet passages connecting the inlet chamber with the intermediate chambers, exhaust passages connecting the exhaust chamber with the intermediate chambers, and a movable pilot valve having two flow controlling portions each movable between one of the inlet passages and one of the exhaust passages and capable of closing either of said passages, the parts being so arranged that when the pilot valve is in an intermediate position both inlet passages and both exhaust passages will be open.

5. A valve mechanism comprising a hollow casing, partitions dividing the interior of the casing into an inlet chamber, an exhaust chamber and two intermediate chambers, a passage communicating with each intermediate chamber, an unbalanced valve in each passage and arranged to open in the direction of flow out of the chamber, a device responsive to the relative fluid pressures in the two intermediate chambers and arranged to open the valve associated with the chamber having the lower fluid pressure whenever the pressures in the two chambers are materially unequal, inlet passages connecting the inlet chamber with the intermediate chambers, exhaust passages connecting the exhaust chamber with the intermediate chambers, the two inlet passages and the two exhaust passages being aligned, and a slidable pilot valve aligned with the inlet and exhaust passages and arranged to control the flow in said passages, the pilot valve having a neutral position in which both inlet and both exhaust passages are open and two other positions in each of which one inlet and one exhaust passage are closed and the other inlet and the other exhaust passage are open.

6. A valve mechanism comprising a hollow casing, partitions dividing the interior of the casing into an inlet chamber, an exhaust chamber and two intermediate chambers, a passage communicating with each intermediate chamber, an unbalanced valve in each passage and arranged to open in the direction of flow out of the chamber, a device responsive to the relative fluid pressures in the two intermediate chambers and arranged to open the valve associated with the chamber having the lower fluid pressure whenever the pressures in the two chambers are materially unequal, inlet passages connecting the inlet chamber with the intermediate chambers, exhaust passages connecting the exhaust chamber with the intermediate chambers, a movable pilot valve to control the flow through the inlet and exhaust passages, a relief passage connecting the inlet chamber with the exhaust chamber, and a spring loaded relief valve normally closing the relief passage.

7. A valve mechanism comprising a hollow casing, partitions dividing the interior of the casing into a central inlet chamber, two intermediate chambers on opposite sides of the inlet chamber and a U-shaped exhaust chamber having its end portions adjacent to the intermediate chambers, a passage communicating with each intermediate chamber, an unbalanced valve in each passage and arranged to open in the direction of flow out of the chamber, a device responsive to the relative fluid pressures in the two intermediate chambers and arranged to open the valve associated with the chamber having the lower fluid pressure whenever the pressures in the two chambers are materially unequal, inlet passages connecting the inlet chamber with the intermediate chambers, exhaust passages connecting the exhaust chamber with the intermediate chambers, the inlet and exhaust passages being aligned, a slidable pilot valve aligned with the inlet and exhaust passages and arranged to control the flow in said passages, the pilot valve having a stem projecting outside the casing through the outer wall of the exhaust chamber, and a stuffing box on said outer wall surrounding said stem.

8. A valve mechanism comprising a hollow casing, partitions dividing the interior of the casing into an inlet chamber, an exhaust chamber and two intermediate chambers, a passage communicating with each intermediate chamber, an unbalanced valve in each passage and arranged to open in the direction of flow out of the chamber, a device responsive to the relative fluid pressures in the two intermediate chambers and arranged to open the valve associated with the chamber having the lower fluid pressure whenever the pressures in the two chambers are materially unequal, inlet passages connecting the inlet chamber with the intermediate chambers, exhaust passages connecting the exhaust chamber with the intermediate chambers, the two inlet passages and the two exhaust passages being circular in cross-section, all of the same diameter, and arranged in direct axial alignment, and a slidable pilot valve aligned with the inlet and exhaust passages and arranged to control the flow in said passages, the pilot valve having two cylindrical portions equal in diameter to the four aligned passages, each cylindrical portion being located between an inlet and an exhaust passage and being smaller in the axial direction than the distance between the adjacent passages, so that when the pilot valve is in the neutral position all of the aligned passages will be open.

PAUL C. TEMPLE.